(12) United States Patent
Hu

(10) Patent No.: US 9,714,592 B2
(45) Date of Patent: Jul. 25, 2017

(54) HANDHELD FOUR-STROKE ENGINE LUBRICATING SYSTEM

(75) Inventor: Jirong Hu, Yongkang (CN)

(73) Assignee: XINGYUE GROUP CO., LTD., Yongkang, Zhejiang (CN)

( * ) Notice: Subject to any disclaimer, the term of this patent is extended or adjusted under 35 U.S.C. 154(b) by 479 days.

(21) Appl. No.: 14/430,552

(22) PCT Filed: Dec. 31, 2011

(86) PCT No.: PCT/CN2011/085122
§ 371 (c)(1),
(2), (4) Date: Mar. 24, 2015

(87) PCT Pub. No.: WO2013/078749
PCT Pub. Date: Jun. 6, 2013

(65) Prior Publication Data
US 2015/0252698 A1    Sep. 10, 2015

(30) Foreign Application Priority Data

Nov. 29, 2011   (CN) .......................... 2011 1 0385313
Nov. 29, 2011   (CN) ...................... 2011 2 0482024 U

(51) Int. Cl.
*F01M 11/03*     (2006.01)
*F01M 13/04*     (2006.01)
(Continued)

(52) U.S. Cl.
CPC ............. *F01M 13/04* (2013.01); *F01M 1/04* (2013.01); *F01M 11/064* (2013.01);
(Continued)

(58) Field of Classification Search
CPC .......... F01M 11/02; F01M 11/03; F01M 1/00; F01M 11/0458; F16N 39/005; B01D 35/18
See application file for complete search history.

(56) References Cited

U.S. PATENT DOCUMENTS

| | | | |
|---|---|---|---|
| 6,293,340 B1* | 9/2001 | Wu ....................... | E21B 43/122 166/105.5 |
| 2003/0136264 A1* | 7/2003 | Keller .................... | F01M 13/04 95/277 |

(Continued)

*Primary Examiner* — Hung Q Nguyen
*Assistant Examiner* — Charles Brauch
(74) *Attorney, Agent, or Firm* — Han IP Corporation; Andy M. Han

(57) ABSTRACT

A handheld four-stroke engine lubricating system comprises: an oil storage chamber formed by a bottom casing and a lower tank body, a crankshaft chamber formed by the lower tank body and an upper tank body, an air valve chamber formed by the upper tank body and a cylinder head cover, a cam chamber formed by the upper tank body and a cam chamber cover, and a tappet chamber connected between the air valve chamber and the cam chamber. The two sides of the upper and lower tank bodies are correspondingly provided with a first and a second oil inlet passages communicated with the oil storage chamber and the crankshaft chamber. The first and the second oil inlet passages are correspondingly provided with first and second check valves thereon. The first oil inlet passage is connected to a hose pressed against the bottom casing.

5 Claims, 10 Drawing Sheets

(51) Int. Cl.
*F02B 63/02* (2006.01)
*F01M 13/02* (2006.01)
*F01M 11/06* (2006.01)
*F01M 1/04* (2006.01)
F01M 1/10 (2006.01)
F01M 11/04 (2006.01)
F16N 39/00 (2006.01)
B01D 35/18 (2006.01)
F01M 11/02 (2006.01)

(52) U.S. Cl.
CPC ............ *F01M 13/02* (2013.01); *F02B 63/02* (2013.01); *B01D 35/18* (2013.01); *F01M 1/10* (2013.01); *F01M 11/02* (2013.01); *F01M 11/03* (2013.01); *F01M 11/0458* (2013.01); *F16N 39/005* (2013.01)

(56) References Cited

U.S. PATENT DOCUMENTS

| 2006/0112916 A1* | 6/2006 | Yoshijima | F01L 1/344 |
| | | | 123/90.15 |
| 2009/0283067 A1* | 11/2009 | Kurihara | F01M 1/04 |
| | | | 123/196 A |
| 2009/0308249 A1* | 12/2009 | Anderson | B01D 45/08 |
| | | | 95/261 |

* cited by examiner

HANDHELD FOUR-STROKE ENGINE LUBRICATING SYSTEM

CROSS REFERENCE TO RELATED APPLICATIONS

This application is the U.S. national phase application of International application number PCT/CN2011/085122, filed on 31 Dec. 2011, which claims the priority benefit of China Patent Applications No. 201120482024.7 and No. 201110385313.X, both filed on 29 Nov. 2011. The above-identified applications are hereby incorporated by reference in their entirety.

TECHNICAL FIELD

The present disclosure relates to a handheld four-stroke engine and, in particular, to a handheld four-stroke engine lubricating system.

BACKGROUND

With the progress of science and technology and rapid development of economy, both urban and rural areas take on a brand-new look, and people's family living conditions and living standard are significantly improved. Handheld four-stroke machines mainly used as garden tools (for example, earth augers, ice augers, ploughing machines and lawn trimmers etc.) undergo a rapid development. Two-stroke engines available at arbitrary direction are predominately used in the present market of small handheld engines. However, as the environmental awareness rises, requirements for exhaust emission are improved continuously. Therefore, it is an inevitable trend that handheld four-stroke engines will take place of handheld two-stroke engines.

However, a handheld four-stroke engine has a number of shortcomings in use. Firstly, the engine must be equipped with a lubricating system enabling efficient circulation of lubricating oil in order to ensure reliable running of a crankshaft connecting rod piston mechanism and a valve mechanism etc. However, an existing lubricating system is unable to deliver lubricating oil rapidly and unimpededly to working chambers due to its zigzag oil ways, complex structure, cumbersome assembly and difficult production and processing, which reduces the cycle efficiency of lubricating oil to some extent. Secondly, when the engine runs at arbitrary rotation angle, pressure distribution in oil return passage inside the lubricating system is uneven due to poor oil-air separation and poor circulation of the lubricating system, which leads to poor running reliability and large consumption of engine oil, directly affecting the running efficiency of the engine. For these reasons, many manufacturers and persons of insight try to develop and manufacture new engines in order to overcome the above-mentioned defects. Unfortunately, an ideal engine is not manufactured until now.

SUMMARY

In order to overcome the above-mentioned defects of the existing handheld four-stroke engine, the present disclosure aims at providing a handheld four-stroke engine lubricating system characterized by simple and reasonable structure, quick cycling speed, high lubricating efficiency, good oil-air separation effect, and stable operation in any position.

The present disclosure adopts such a technical scheme for solving the technical question as below: it comprises an oil storage chamber formed by a bottom casing and a lower tank body, a crankshaft chamber formed by the lower tank body and an upper tank body, an air valve chamber formed by the upper tank body and a cylinder head cover, a cam chamber formed by the upper tank body and a cam chamber cover, and a tappet chamber connected between the air valve chamber and the cam chamber; the two sides of the upper and lower tank bodies are correspondingly provided with a first and a second oil inlet passages communicated with the oil storage chamber and the crankshaft chamber; the first and the second oil inlet passages are correspondingly provided with a first and a second check valves thereon; the first oil inlet passage is connected to a hose pressed against the bottom casing; the head of the hose is provided with a first oil suction port; the first oil inlet passage is provided with a second oil suction port; and the second oil inlet passage is provided with a third oil suction port.

Between the crankshaft chamber and the air valve chamber is provided with an oil inlet passage, the oil inlet passage is provided with a check valve, between the air valve chamber and the oil storage chamber is provided with an oil inlet passage, between the cam chamber and the crankshaft chamber is provided with a third oil inlet passage, between the cam chamber and the oil storage chamber is provided with an oil return passage of the cam chamber.

On the bottom of the air valve chamber is provided with at least a positive-going oil return hole communicated with the oil return passage, on the cylinder head cover is provided with an annular oil-returning slot communicated with the oil return passage, on four directions (front, back, left and right) of the cylinder head cover are respectively provided with at least a side oil return hole communicated with the annular oil-returning slot, on the top of the cylinder head cover is provided with at least an inverted oil return hole communicated with the oil return passage.

In the cam chamber is provided with a camshaft, on the camshaft is provided with a centrifugal separator mechanism which comprises a separation shell, a fixed sleeve and a filter screen, wherein inside of the separation shell is provided with a hollow cavity, the filter screen is arranged in the hollow cavity and the fixed sleeve is fixed on the inner ring of the separation shell and is assembled on the camshaft, on the outer ring of the separation shell is provided with a centrifugal air inlet port communicated with the hollow cavity, on the inner ring of the separation shell, the fixed sleeve and the camshaft is respectively provided with a centrifugal air outlet passage communicated with the hollow cavity, the centrifugal air outlet passage is connected to an air filter through a respiratory passage.

By adopting the above structure, the present disclosure has a number of advantages and effects compared with the prior art as described below.

Firstly, a first and a second oil inlet passages are arranged between the oil storage chamber and the crankshaft chamber, and the first oil inlet passage is connected to a hose pressed against the bottom casing, which allows the engine in any position to absorb lubricating oil from the oil storage chamber for efficiently lubricating work systems, thus guaranteeing proper functioning of the engine in any position.

Secondly, on the cylinder head cover is provided with an annular oil-returning slot communicated with the oil return passage, on four directions (front, back, left and right) of the cylinder head cover are respectively provided with at least a side oil return hole communicated with the annular oil-returning slot, on the top of the cylinder head cover is provided with at least an overhead oil return hole communicated with the oil return passage, which not only greatly improves oil absorption capacity of the cylinder head cover and allows lubricating oil in the air valve chamber rapidly and effectively to flow back to the oil storage chamber in any position, but also prevents the cylinder head cover from accumulating lubricating oil, thus guaranteeing the optimal lubricating effect by the minimum lubricating oil.

Thirdly, on the camshaft is provided with a rotary centrifugal separator mechanism; a gasoline engine respiration and ventilation passage consists of a centrifugal air inlet port, the inner ring of a sealed housing, a fixed sleeve, and the centrifugal air outlet passage on the camshaft; oil and air entering into the centrifugal separator mechanism from the cam chamber are separated, oil drops separated are centrifuged back to the cam chamber by centrifugal force, and air separated enters into the air filter for combustion. The present disclosure has the advantages of smooth respiration and ventilation, low air-resistance, good oil-air separation effect, low consumption of lubricating oil, stable and reliable running and high running efficiency.

Figure 1:
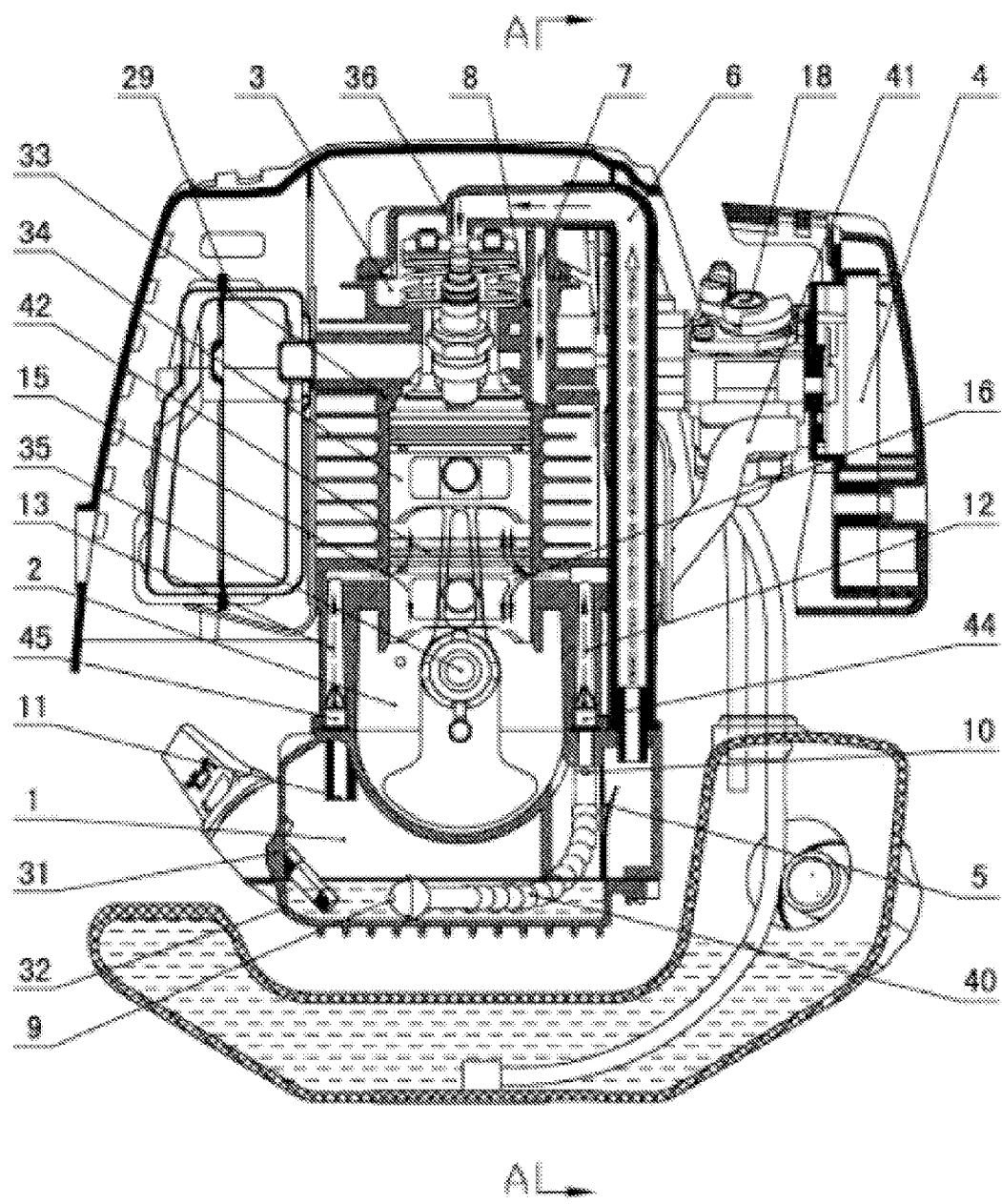
FIG. 1 is a structure diagram of the handheld four-stroke engine lubricating system.
Figure 2:
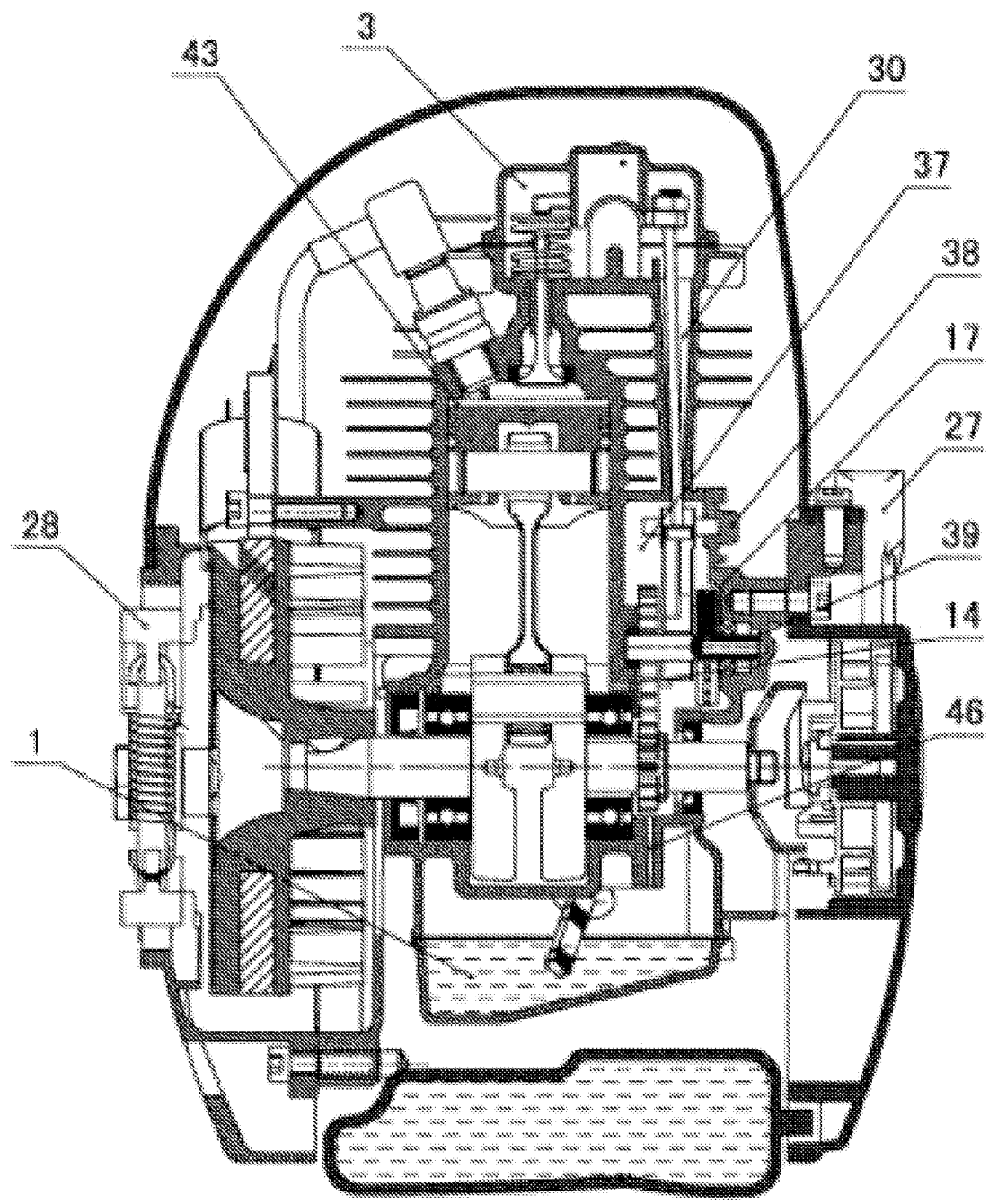
FIG. 2 is a cross-sectional view along line A-A of FIG. 1.
Figure 3:
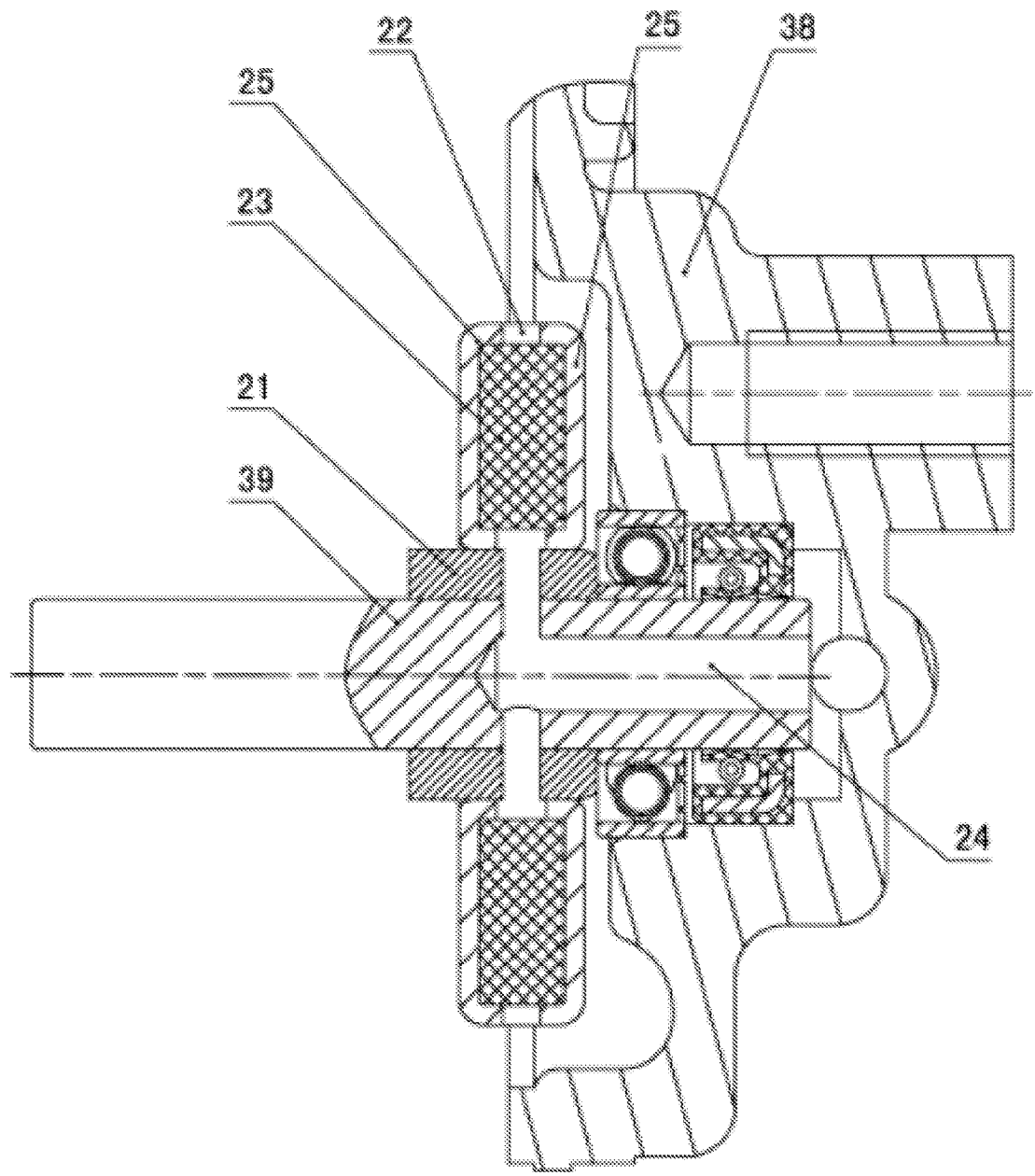
FIG. 3 is an enlarged view of the centrifugal separator mechanism of the handheld four-stroke engine lubricating system.
Figure 4:
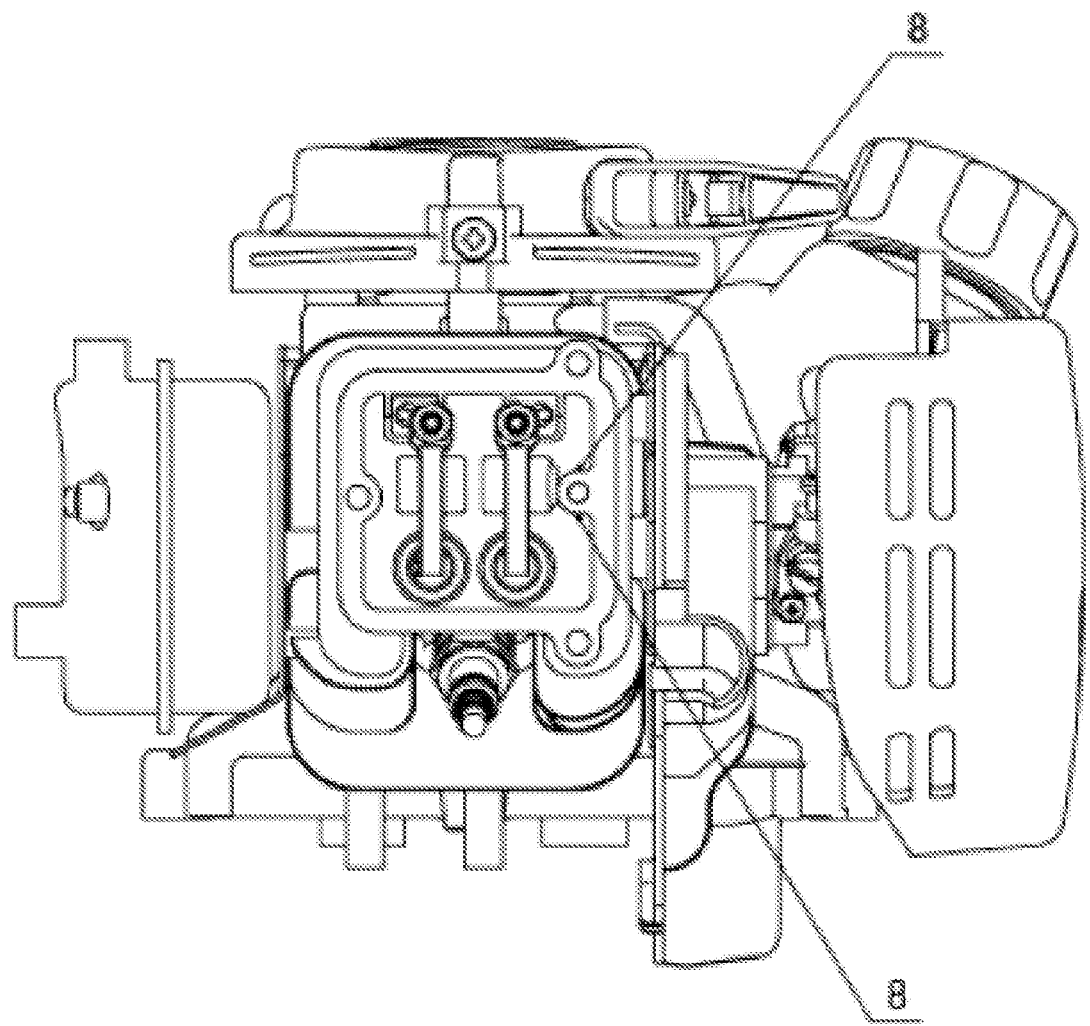
FIG. 4 is a vertical view of the handheld four-stroke engine lubricating system with its wind scooper and cylinder head cover disassembled.
Figure 5:
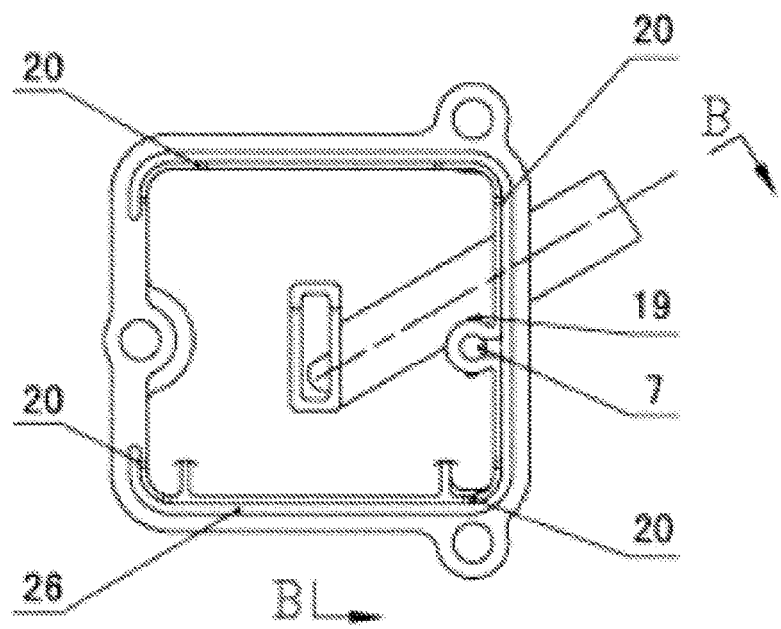
FIG. 5 is a structure diagram of the cylinder head cover of the handheld four-stroke engine lubricating system.
Figure 6:
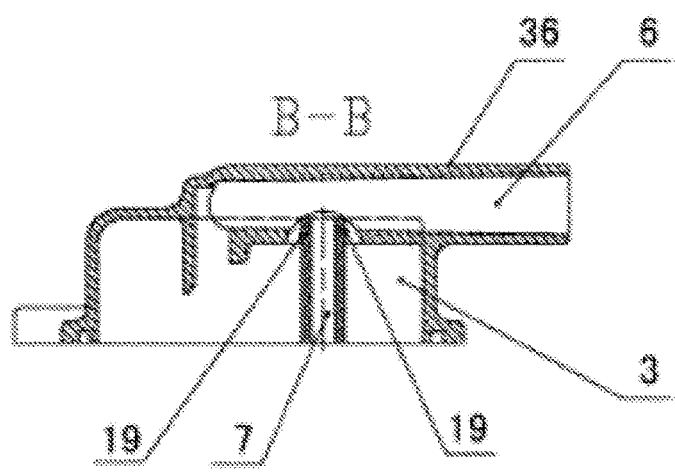
FIG. 6 is a cross-sectional view along line B-B of FIG. 5.

List of components: oil storage chamber 1, crankshaft chamber 2, air valve chamber 3, air filter 4, check valve 5, oil inlet passage 6, oil return passage 7, positive-going oil return hole 8, first oil suction port 9, second oil suction port 10, third oil suction port 11, first oil inlet passage 12, second oil inlet passage 13, third oil inlet passage 14, second oil inlet port 15, first oil inlet port 16, centrifugal separator mechanism 17, carburetor 18, inverted oil return hole 19, side oil return hole 20, fixed sleeve 21, centrifugal air inlet port 22, filter screen 23, centrifugal air outlet passage 24, separation shell 25, annular oil-returning slot 26, recoil start mechanism 27, clutch mechanism 28, silencer 29, tappet chamber 30, lower tank body 31, bottom casing 32, upper tank body 33, piston 34, crankshaft connecting rod assembly 35, cylinder head cover 36, cam chamber 37, cam chamber cover 38, camshaft 39, hose 40, respiratory passage 41, lower dead center 42, upper dead center 43, first check valve 44, second check valve 45, oil return passage 46 of the cam chamber.

DETAILED DESCRIPTION OF THE PREFERRED EMBODIMENTS

As shown in FIGS. 1-6, the present disclosure provides a handheld four-stroke engine lubricating system, comprising an oil storage chamber 1 formed by a bottom casing 32 and a lower tank body 31, a crankshaft chamber 2 formed by the lower tank body 31 and an upper tank body 33, an air valve chamber 3 formed by the upper tank body 33 and a cylinder head cover 36, a cam chamber 37 formed by the upper tank body 33 and a cam chamber cover 38, and a tappet chamber 30 connected between the air valve chamber 3 and the cam chamber 37; inside the crankshaft chamber 2 is provided with a crankshaft connecting rod assembly 35 and a piston 34, a carburetor 18 is connected to an oil tank, the two sides of the upper and lower tank bodies 33 and 31 are correspondingly provided with a first and a second oil inlet passages 12 and 13 communicated with the oil storage chamber 1 and the crankshaft chamber 2; the first and the second oil inlet passages 12 and 13 are correspondingly provided with a first and a second check valves 44 and 45 thereon; the first oil inlet passage 12 is communicated with the crankshaft chamber 2 through a first oil inlet port 16, the second oil inlet passage 13 is communicated with the crankshaft chamber 2 through a second oil inlet port 15, the first oil inlet passage 12 is connected to a hose 40 pressed against the bottom casing 32, the head of the hose 40 is provided with a first oil suction port 9, the first oil inlet passage 12 is provided with a second oil suction port 10, and the second oil inlet passage 13 is provided with a third oil suction port 11.

Between the crankshaft chamber 2 and the air valve chamber 3 is provided with an oil inlet passage 6, the oil inlet passage 6 is provided with a check valve 5, between the air valve chamber 3 and the oil storage chamber 1 is provided with an oil inlet passage 7, between the cam chamber 37 and the crankshaft chamber 2 is provided with a third oil inlet passage 14, between the cam chamber 37 and the oil storage chamber 1 is provided with an oil return passage 46 of the cam chamber. On the bottom of the air valve chamber 3 is provided with at least a positive-going oil return hole 8 communicated with the oil return passage 7, on the cylinder head cover 36 is provided with an annular oil-returning slot 26 communicated with the oil return passage 7, on four directions (front, back, left and right) of the cylinder head cover 36 are respectively provided with at least a side oil return hole 20 communicated with the annular oil-returning slot 26, on the top of the cylinder head cover 36 is provided with at least an inverted oil return hole 19 communicated with the oil return passage 7.

In the cam chamber 37 is provided with a camshaft 39, on the camshaft 39 is provided with a centrifugal separator mechanism 17 which comprises a separation shell 25, a fixed sleeve 21 and a filter screen 23, wherein inside of the separation shell 25 is provided with a hollow cavity, the filter screen 23 is arranged in the hollow cavity, the fixed sleeve 21 is fixed on the inner ring of the separation shell 25 and is assembled on the camshaft 39, on the outer ring of the separation shell 25 is provided with a centrifugal air inlet port 22 communicated with the hollow cavity, on the inner ring of the separation shell 25, the fixed sleeve 21 and the camshaft 39 is respectively provided with a centrifugal air outlet passage 24 communicated with the hollow cavity, the centrifugal air outlet passage 24 is connected to an air filter 4 through a respiratory passage 41.

The working principle of the present disclosure is described below.

When the engine is arranged and works at forward direction, as shown in FIGS. 1-6, the engine starts a cycle and the crankshaft starts to rotate, the lower edge of the piston 34 moves from the lower dead center 42 upward to the position of the first oil inlet port 16 and the second oil inlet port 15. In this process, negative pressure is produced in the crankshaft chamber 2, mixed gas composed of fresh air and surplus oil mist in the cam chamber 37 is sucked into the crankshaft chamber 2 through the third oil inlet passage 14. In the process of high-speed rotation of the centrifugal separator mechanism 17, oil mist from the centrifugal air inlet port 22 enters into the separation shell 25, and is separated into oil drops and air when passing through a narrow and small space inside the filter screen 23; the lubricating oil drops separated are, under the negative pressure formed by the piston 34, sucked back to the cam chamber 37 together with the fresh air separated, while the fresh air in the air filter 4 is sucked into the centrifugal separator mechanism 17.

The crankshaft continues rotating, the lower edge of the piston 34 continues moving from the position of the first oil inlet port 16 and the second oil inlet port 15 upward to the position of the upper dead center 43. The first oil inlet port 16 and the second oil inlet port 15 on the upper tank body 33 are opened in the moving process of the piston 34, simultaneously, the first oil inlet passage 12 and the second oil inlet passage 13 connected between the crankshaft chamber 2 and the oil storage chamber 1 are opened, the fresh air in the air filter 4 is sucked into the centrifugal separator mechanism 17, the fresh air in the centrifugal separator mechanism 17 is sucked into the cam chamber 37 together with the oil drops separated. The oil mist in the cam chamber 37 is sucked into the air valve chamber 3, surplus lubricating oil in the air valve chamber 3 is sucked back to the oil storage chamber 1 through the positive-going oil return hole 8 by intense negative pressure. The lubricating oil in the oil storage chamber 1 is sucked in through the first oil suction port 9 below the oil level, and is sucked into the crankshaft chamber 2 through the first check valve 44 and the first oil inlet passage 12 by intense negative pressure formed at the upstroke of the piston 34. Simultaneously, mixed gas in the oil storage chamber 1 enters into the crankshaft chamber 2 through the second oil suction port 10 and the third oil suction port 11 above the oil level in two ways, wherein one way of mixed gas is sucked into the crankshaft chamber 2 through the second oil suction port 10, the first check valve 44 and the first oil inlet passage 12 by intense negative pressure formed at the upstroke of the piston 34; while the other way of mixed gas is sucked into the crankshaft chamber 2 through the third oil suction port 11, the second check valve 45 and the second oil inlet passage 13 by intense negative pressure formed at the upstroke of the piston 34. And the mixed gas is transformed into oil mist by rotation of the crankshaft connecting rod assembly 35.

The crankshaft continues rotating, the piston 34 moves from the upper dead center 43 downward to the lower dead center 42, in this progress, positive pressure is formed inside the crankshaft chamber 2, both the first check valve 44 in the first oil inlet passage 12 and the second check valve 45 in the second oil inlet passage 13 are closed, while the check valve 5 leading to the air valve chamber 3 is opened, the oil mist in the crankshaft chamber 2 enters into the air valve chamber 3 through the oil return passage 7 under intense pressure. A part of oil mist in the air valve chamber 3 enters into the cam chamber 37 through the tappet chamber 30 under pressure. Surplus escaping gas in the cam chamber 37 enters into the centrifugal separator mechanism 17 under pressure. Oil drops separated by the centrifugal separator mechanism 17 return to the cam chamber 37, and waste air separated enters into the air filter 4.

When the engine is shut down, residual lubricating oil in the cam chamber 37 flows from the oil return passage 46 of the cam chamber back to the oil storage chamber 1, residual lubricating oil in the air valve chamber 3 flows back to the oil storage chamber 1 through the positive-going oil return hole 8 and the oil return passage 7.

Figure 7:
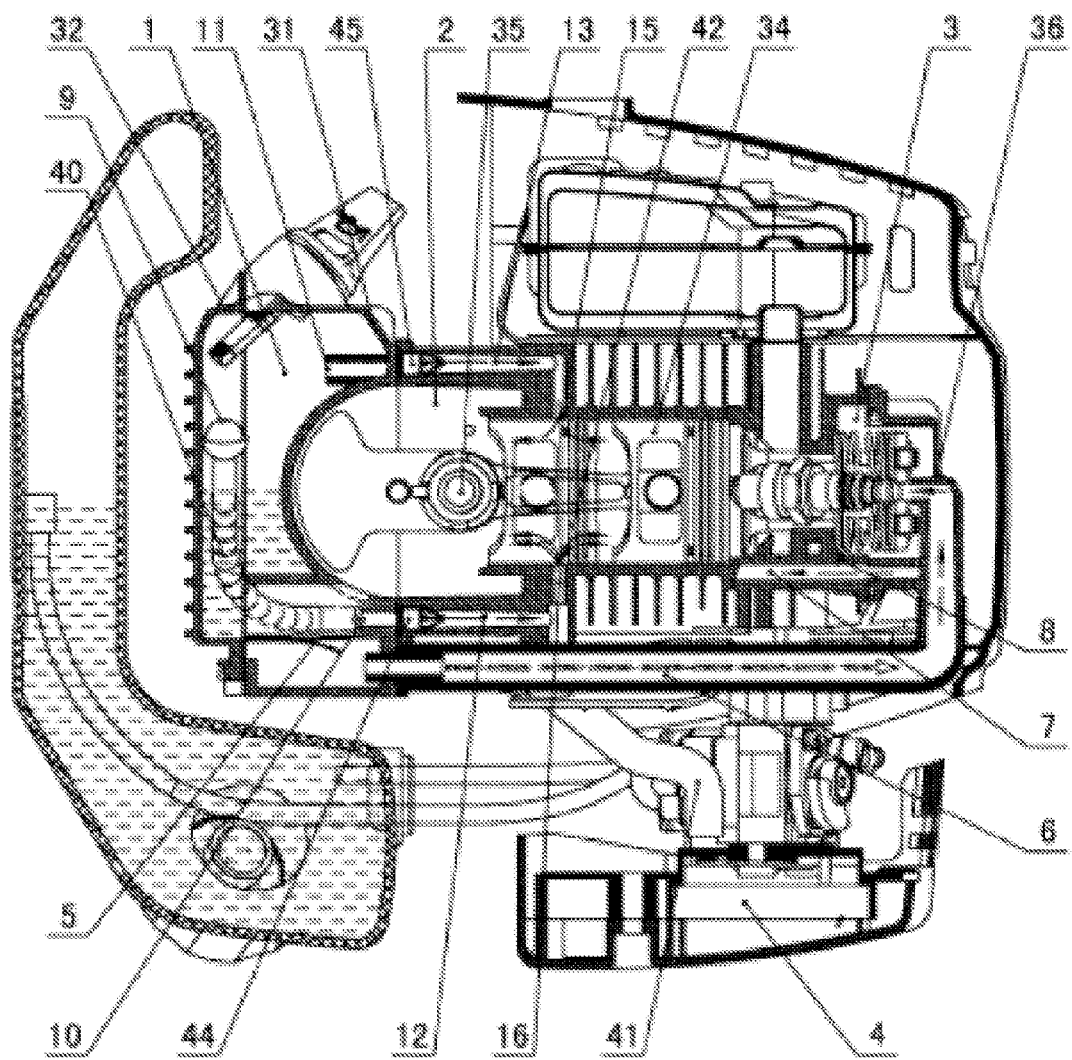
FIG. 7 is a vertical view of the air filter of the handheld four-stroke engine lubricating system.

When the engine works at side direction and the air filter 4 is adown, just as shown in FIG. 7, and the lower edge of the piston 34 moves from the lower dead center 42 upward to the position of the first oil inlet port 16 and the second oil inlet port 15, the operating principle of the engine is the same as it works at forward direction, not repeated any more.

The crankshaft continues rotating, the lower edge of the piston 34 moves from the position of the first oil inlet port 16 and the second oil inlet port 15 upward to the upper dead center 43. In this process, both the first check valve 44 arranged on the first oil inlet passage 12 and the second check valve 45 arranged on the second oil inlet passage 13 are opened simultaneously. At this time, the first oil suction port 9 on the hose 40 is above the oil level, and the third oil suction port 11 on the second oil inlet passage 13 is also above the oil level, while the second oil suction port 10 on the first oil inlet passage 12 is below the oil level, the lubricating oil is sucked into the crankshaft chamber 2 through the second oil suction port 10, the first check valve 44 and the first oil inlet passage 12 by intense negative pressure formed at the upstroke of the piston 34. One way of mixed gas is sucked into the crankshaft chamber 2 through the third oil suction port 11, the second check valve 45 and the second oil inlet passage 13 by intense negative pressure formed at the upstroke of the piston 34; while the other way of mixed gas is sucked into the crankshaft chamber 2 through the first oil suction port 9, the hose 40, the first check valve 44 and the first oil inlet passage 12 by intense negative pressure formed at the upstroke of the piston 34, thus guaranteeing both oil and oil mist can be sucked in simultaneously. The lubricating oil sucked into the crankshaft chamber 2 is transformed into oil mist by rotation of the crankshaft connecting rod assembly 35 and the piston 34. Residual lubricating oil and lubricating oil mist in the air valve chamber 3 are sucked back to the oil storage chamber 1 by intense negative pressure through at least one oil return hole 20 arranged on four directions (front, back, left and right) of the air valve chamber 3 and through the oil return passage 7, surplus oil mist in the cam chamber 37 is sucked back to the air valve chamber 3, and the fresh air and the lubricating oil separated in the centrifugal separator mechanism 17 are sucked back to the cam chamber 37. The fresh air in the air filter 4 is sucked into the centrifugal separator mechanism 17. Lubricating oil and air can be rotated and separated at any direction because the centrifugal separator mechanism 17 is arranged near the middle position inside the cam chamber 37.

The crankshaft continues rotating, the piston 34 moves from the upper dead center 43 downward to the lower dead center 42, in this process, the operating principle of the engine is the same as it works at forward direction, not repeated any more.

Figure 8:
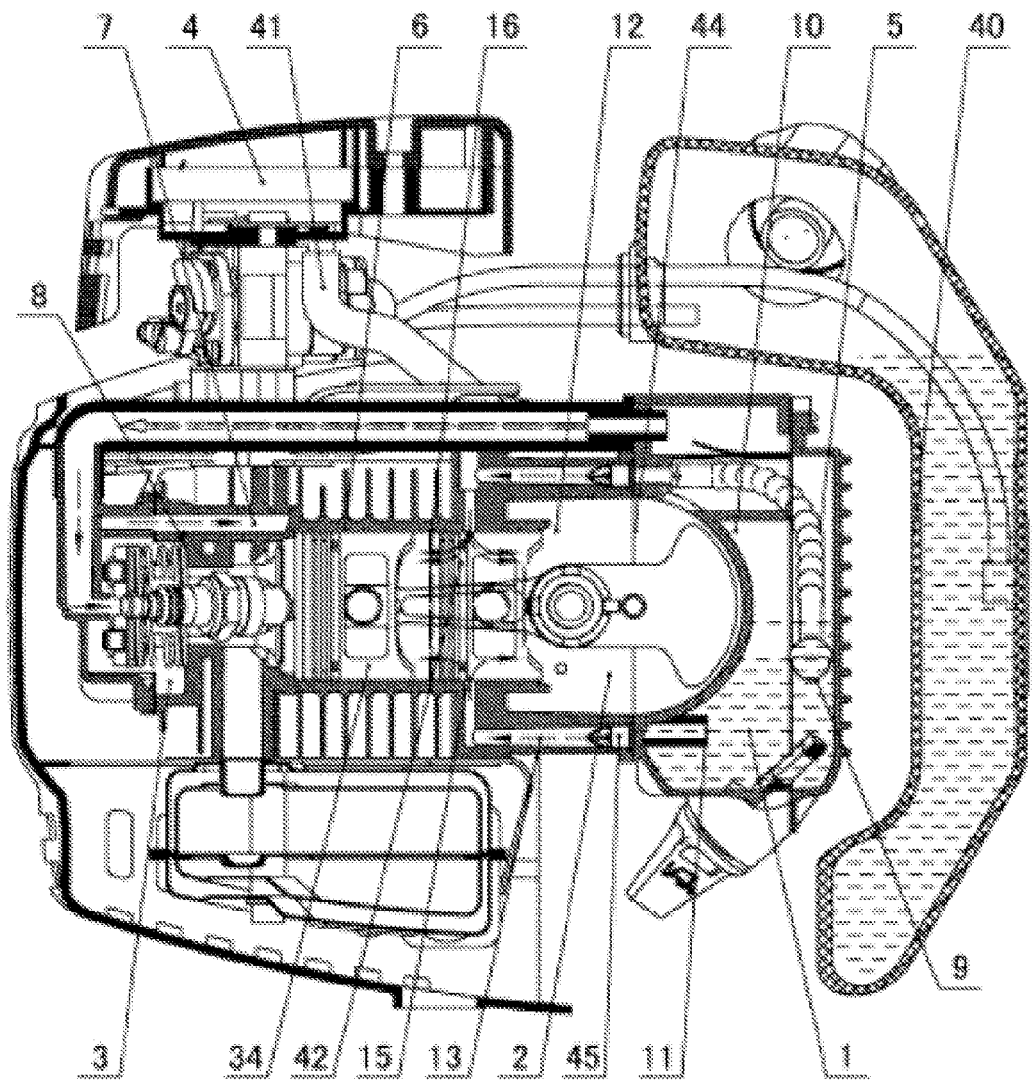
FIG. 8 is a vertical view of a silencer of the handheld four-stroke engine lubricating system.

When the engine works at side direction and the silencer 29 is adown, just as shown in FIG. 8, and the lower edge of the piston 34 moves from the lower dead center 42 upward to the position of the first oil inlet port 16 and the second oil inlet port 15, the operating principle of the engine is the same as it works at forward direction, not repeated any more.

The crankshaft continues rotating, the lower edge of the piston 34 moves from the position of the first oil inlet port 16 and the second oil inlet port 15 upward to the upper dead center 43. In this process, both the first check valve 44 arranged on the first oil inlet passage 12 and the second check valve 45 arranged on the second oil inlet passage 13 are opened simultaneously. At this time, the first oil suction port 9 on the hose 40 is below the oil level, and the third oil suction port 11 on the second oil inlet passage 13 is also below the oil level, while the second oil suction port 10 is above the oil level; one way of lubricating oil is sucked into the crankshaft chamber 2 through the third oil suction port 11, the second check valve 45 and the second oil inlet passage 13 by intense negative pressure, while the other way of lubricating oil is sucked into the crankshaft chamber 2 through the first oil suction port 9, the hose 40, the first check valve 44 and the first oil inlet passage 12 by intense negative pressure formed at the upstroke of the piston 34; the mixed gas is sucked into the crankshaft chamber 2 through the second oil suction port 10, the first check valve 44 and the first oil inlet passage 12 by intense negative pressure formed at the upstroke of the piston 34, thus guaranteeing both oil and oil mist can be sucked in simultaneously, the lubricating oil sucked into the crankshaft chamber 2 is transformed into oil mist by rotation of the crankshaft connecting rod assembly 35 and the piston 34. Residual lubricating oil and oil mist in the air valve chamber 3 are sucked back to the oil storage chamber 1 by intense negative pressure through at least one oil return hole 20 arranged on four directions (front, back, left and right) of the air valve chamber 3 and through the oil return passage 7, surplus oil mist in the cam chamber 37 is sucked back to the air valve chamber 3, the fresh air and the lubricating oil separated in the centrifugal separator mechanism 17 are sucked back to the cam chamber 37, and the fresh air in the air filter 4 is sucked into the centrifugal separator mechanism 17. Lubricating oil and air can be rotated and separated at any direction because the centrifugal separator mechanism 17 is arranged near the middle position inside the cam chamber 37.

The crankshaft continues rotating, the piston 34 moves from the upper dead center 43 downward to the lower dead center 42, in this process, the operating principle of the engine is the same as it works at forward direction, not repeated any more.

Figure 10:
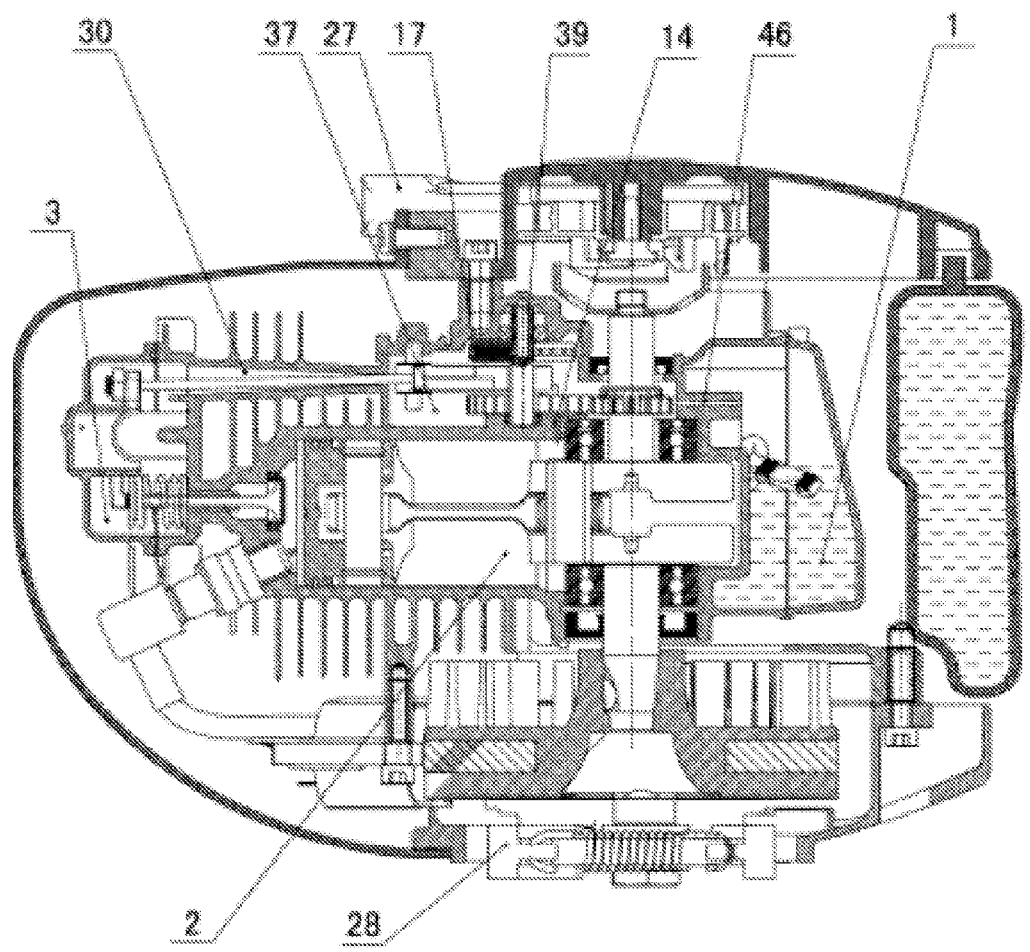
FIG. 10 is a vertical view of the clutch mechanism of the handheld four-stroke engine lubricating system.

When the engine works at side direction and the clutch mechanism 28 is adown, just as shown in FIG. 10, and the lower edge of the piston 34 moves from the lower dead center 42 upward to the position of the first oil inlet port 16 and the second oil inlet port 15, the operating principle of the engine is the same as it works at forward direction, not repeated any more.

The crankshaft continues rotating, the lower edge of the piston 34 moves from the position of the first oil inlet port 16 and the second oil inlet port 15 upward to the upper dead center 43. In this process, both the first check valve 44 arranged on the first oil inlet passage 12 and the second check valve 45 arranged on the second oil inlet passage 13 are opened simultaneously. At this time, the first oil suction port 9 on the hose 40 is below the oil level, while the third oil suction port 11 on the second oil inlet passage 13 is above the oil level, and the second oil suction port 10 is also above the oil level; the lubricating oil is sucked into the crankshaft chamber 2 through the first oil suction port 9, the first check valve 44 and the first oil inlet passage 12 by intense negative pressure formed at the upstroke of the piston 34; mixed gas enters into the crankshaft chamber 2 through two ways, one way of mixed gas is sucked into the crankshaft chamber 2 through the second oil suction port 10, the first check valve 44 and the first oil inlet passage 12 by intense negative pressure formed at the upstroke of the piston 34, while the other way of mixed gas is sucked into the crankshaft chamber 2 through the third oil suction port 11, the second check valve 45 and the second oil inlet passage 13 by intense negative pressure formed at the upstroke of the piston 34, thus guaranteeing both oil and oil mist can be sucked in simultaneously, the lubricating oil sucked into the crankshaft chamber 2 is transformed into oil mist by rotation of the crankshaft connecting rod assembly 35 and the piston 34. Residual lubricating oil and lubricating oil mist in the air valve chamber 3 are sucked back to the oil storage chamber 1 by intense negative pressure through at least one oil return hole 20 arranged on four directions (front, back, left and right) of the air valve chamber 3 and through the oil return passage 7; surplus oil mist in the cam chamber 37 is sucked back to the air valve chamber 3, the fresh air and the lubricating oil separated in the centrifugal separator mechanism 17 are sucked into the cam chamber 37; the fresh air in the air filter 4 is sucked into the centrifugal separator mechanism 17. Lubricating oil and air can be rotated and separated at any direction because the centrifugal separator mechanism 17 is arranged near the middle position inside the cam chamber 37.

The crankshaft continues rotating, the piston 34 moves from the upper dead center 43 downward to the lower dead center 42, in this process, the operating principle of the engine is the same as it works at forward direction, not repeated any more.

Figure 11:
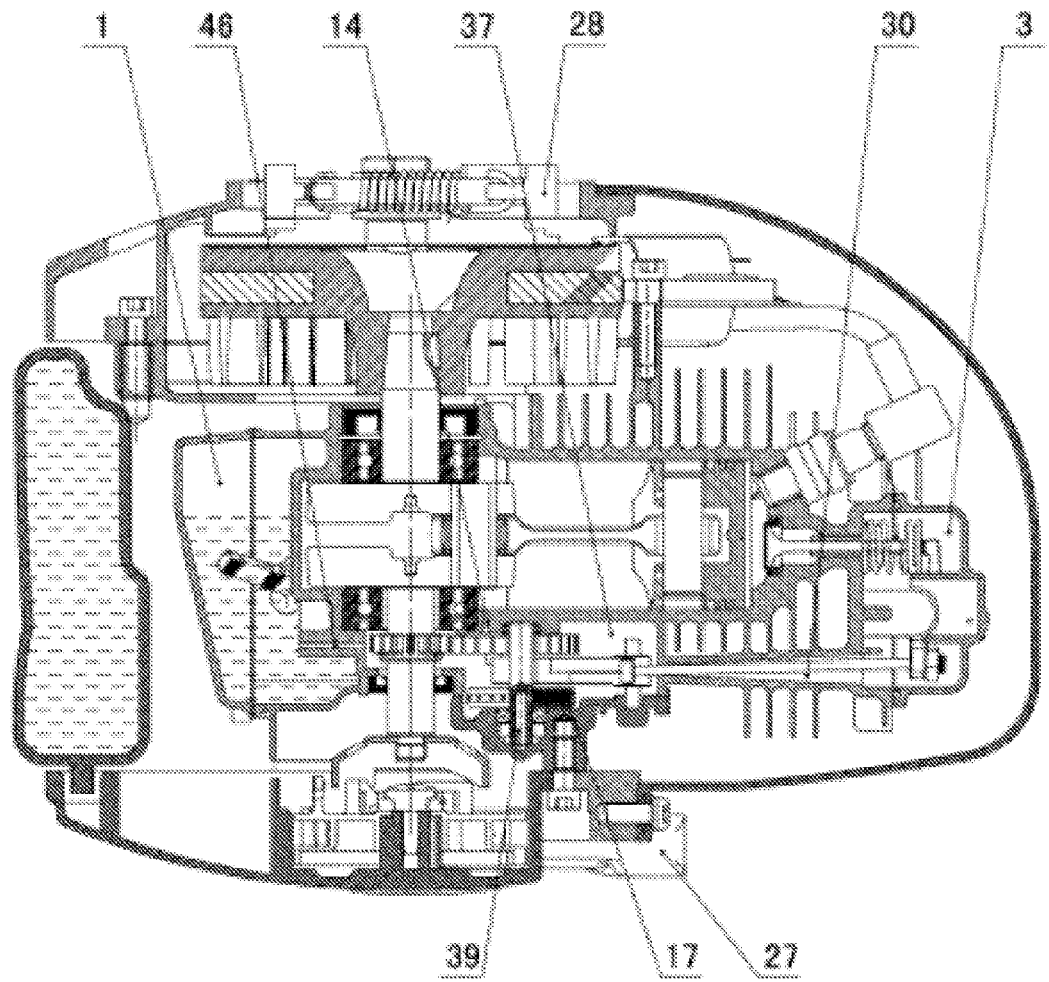
FIG. 11 is a vertical view of a recoil start mechanism of the handheld four-stroke engine lubricating system.

When the engine works at side direction and the recoil start mechanism 27 is adown, just as shown in FIG. 11, the operating principle of the engine is the same as it works at side direction and the clutch mechanism 28 is adown, not repeated any more.

Figure 9:
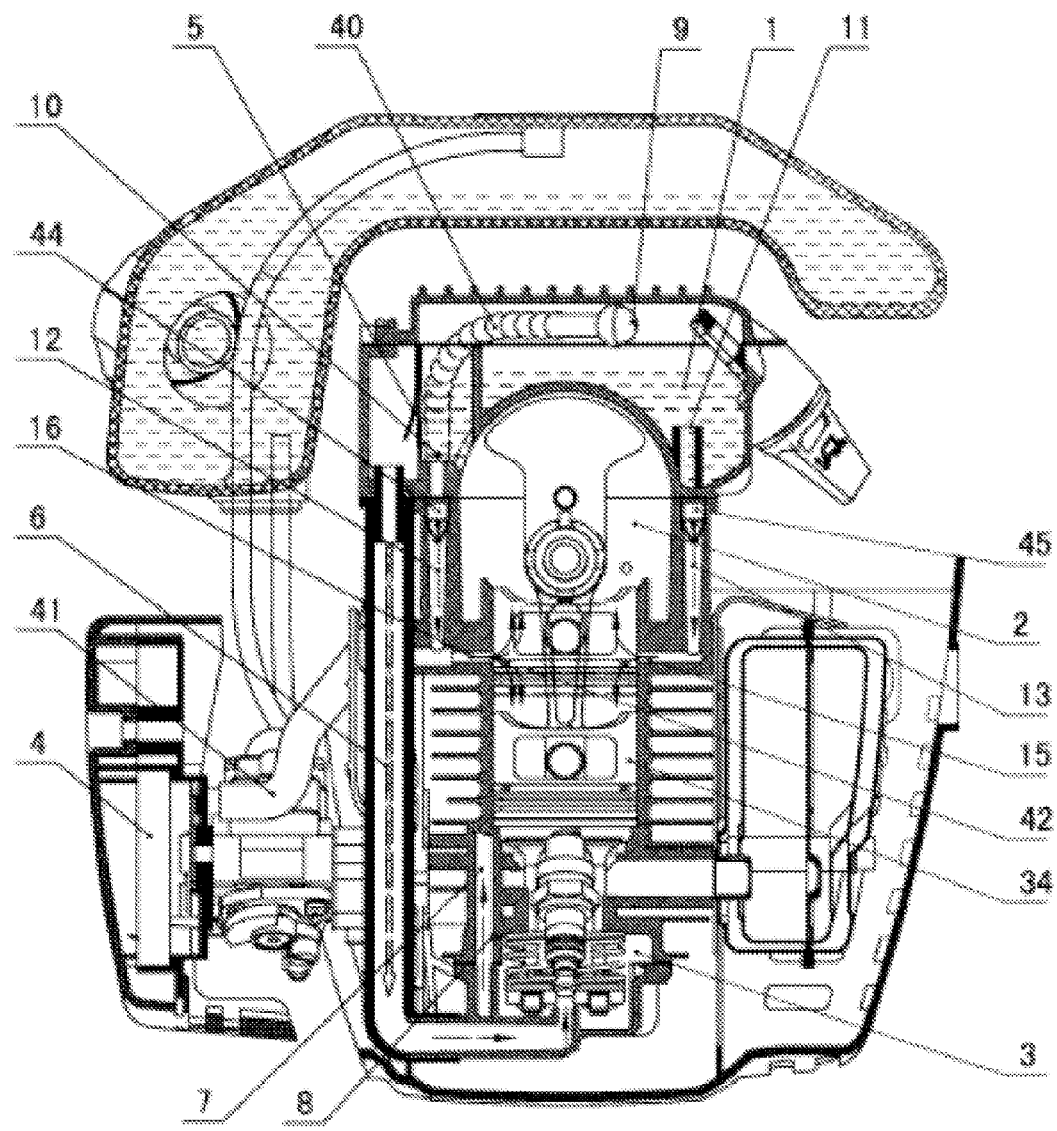
FIG. 9 is a diagrammatic drawing of the handheld four-stroke engine lubricating system inverted.

When the engine works at inverted direction, just as shown in FIG. 9, and the lower edge of the piston 34 moves from the lower dead center 42 upward to the position of the first oil inlet port 16 and the second oil inlet port 15, the operating principle of the engine is the same as it works at forward direction, not repeated any more.

The crankshaft continues rotating, the lower edge of the piston 34 moves from the position of the first oil inlet port 16 and the second oil inlet port 15 upward to the upper dead center 43. In this process, both the first check valve 44 arranged on the first oil inlet passage 12 and the second check valve 45 arranged on the second oil inlet passage 13 are opened simultaneously. At this time, the first oil suction port 9 on the hose 40 is above the oil level, while the third oil suction port 11 on the second oil inlet passage 13 is below the oil level, and the second oil suction port 10 is also below the oil level; one way of lubricating oil is sucked into the crankshaft chamber 2 through the third oil suction port 11, the second check valve 45 and the second oil inlet passage 13 by intense negative pressure formed at the upstroke of the piston 34, while the other way of lubricating oil is sucked into the crankshaft chamber 2 through the second oil suction port 10, the first check valve 44 and the first oil inlet passage 12 by intense negative pressure formed at the upstroke of the piston 34, and mixed gas is sucked into the crankshaft chamber 2 through the first oil suction port 9, the first check valve 44 and the first oil inlet passage 12 by intense negative pressure formed at the upstroke of the piston 34, thus guaranteeing both oil and oil mist can be sucked in simultaneously, the lubricating oil sucked into the crankshaft chamber 2 is transformed into oil mist by rotation of the crankshaft connecting rod assembly 35 and the piston 34.

Residual lubricating oil and oil mist in the air valve chamber 3 are sucked back to the oil storage chamber 1 by intense negative pressure through at least one oil return hole 19 arranged at lower position of the air valve chamber 3 and through the oil return passage 7, surplus oil mist in the cam chamber 37 is sucked back to the air valve chamber 3, the fresh air and the lubricating oil separated in the centrifugal separator mechanism 17 are sucked into the cam chamber 37. The fresh air in the air filter 4 is sucked into the centrifugal separator mechanism 17. Lubricating oil and air can be rotated and separated at any direction because the centrifugal separator mechanism 17 is arranged near the middle position inside the cam chamber 37.

The crankshaft continues rotating, the piston 34 moves from the upper dead center 43 downward to the lower dead center 42, in this process, the operating principle of the engine is the same as it works at forward direction, not repeated any more.

What is claimed is:

1. A handheld four-stroke engine lubricating system, comprising:
    an oil storage chamber formed by a bottom casing and a lower tank body and configured to store a lubricating oil therein;
    a crankshaft chamber formed by the lower tank body and an upper tank body;
    an air valve chamber formed by the upper tank body and a cylinder head cover;
    a cam chamber formed by the upper tank body and a cam chamber cover; and
    a tappet chamber connected between the air valve chamber and the cam chamber;
    wherein:
        two opposite sides of the upper and lower tank bodies are correspondingly provided with a first and a second oil inlet passages each of which connected between the oil storage chamber and the crankshaft chamber such that the lubricating oil enters the crankshaft chamber through either or both of the first oil inlet passage and the second oil inlet passage;
        the first and the second oil inlet passages are correspondingly provided with first and second check valves thereon;
        the first oil inlet passage is connected to a hose pressed against the bottom casing;
        a head of the hose is provided with a first oil suction port;
        the first oil inlet passage is also provided with a second oil suction port to allow the lubricating oil to enter the crankshaft chamber through the first oil inlet passage via either or both of the hose and the second oil suction port; and
        the second oil inlet passage is provided with a third oil suction port.

2. The handheld four-stroke engine lubricating system according to claim 1, wherein between the crankshaft chamber and the air valve chamber is provided with an oil inlet passage, wherein the oil inlet passage is provided with a check valve, wherein between the air valve chamber and the oil storage chamber is provided with an oil return passage, wherein between the cam chamber and the crankshaft chamber is provided with a third oil inlet passage, and wherein between the cam chamber and the oil storage chamber is provided with an oil return passage of the cam chamber.

3. The handheld four-stroke engine lubricating system according to claim 2, wherein on the bottom of the air valve chamber is provided with at least a positive-going oil return hole communicated with the oil return passage, wherein on the cylinder head cover is provided with an annular oil-returning slot communicated with the oil return passage, wherein on each of four directions, including front, back, left and right, of the cylinder head cover is respectively provided with at least a side oil return hole communicated with the annular oil-returning slot, and wherein on top of the cylinder head cover is provided with at least an inverted oil return hole communicated with the oil return passage.

4. The handheld four-stroke engine lubricating system according to claim 2, wherein in the cam chamber is provided with a camshaft, wherein on the camshaft is provided with a centrifugal separator mechanism which comprises a separation shell, a fixed sleeve and a filter screen, wherein inside of the separation shell is provided with a hollow cavity, wherein the filter screen is arranged in the hollow cavity, wherein the fixed sleeve is fixed on the inner ring of the separation shell and is assembled on the camshaft, wherein on the outer ring of the separation shell is provided with a centrifugal air inlet port communicated with the hollow cavity, wherein on the inner ring of the separation shell, the fixed sleeve and the camshaft is respectively provided with a centrifugal air outlet passage communicated with the hollow cavity, and wherein the centrifugal air outlet passage is connected to an air filter through a respiratory passage.

5. The handheld four-stroke engine lubricating system according to claim 3, wherein in the cam chamber is provided with a camshaft, wherein on the camshaft is provided with a centrifugal separator mechanism which comprises a separation shell, a fixed sleeve and a filter screen, wherein inside of the separation shell is provided with a hollow cavity, wherein the filter screen is arranged in the hollow cavity, wherein the fixed sleeve is fixed on the inner ring of the separation shell and is assembled on the camshaft, wherein on the outer ring of the separation shell is provided with a centrifugal air inlet port communicated with the hollow cavity, wherein on the inner ring of the separation shell, the fixed sleeve and the camshaft is respectively provided with a centrifugal air outlet passage communicated with the hollow cavity, and wherein the centrifugal air outlet passage is connected to an air filter through a respiratory passage.

* * * * *